US012679405B2

(12) United States Patent
Hwang et al.

(10) Patent No.: US 12,679,405 B2
(45) Date of Patent: Jul. 14, 2026

(54) DEVICE AND METHOD FOR CONTROLLING A VEHICLE

(71) Applicants: HYUNDAI MOTOR COMPANY, Seoul (KR); KIA CORPORATION, Seoul (KR)

(72) Inventors: Jae Woong Hwang, Seoul (KR); Kyung Joo Bang, Hwaseong-si (KR); Il Hwan Kim, Hwaseong-si (KR); Dong Hyuk Kim, Hanam-si (KR); Jeong Ki Hong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 302 days.

(21) Appl. No.: 18/535,609

(22) Filed: Dec. 11, 2023

(65) Prior Publication Data

US 2025/0065908 A1 Feb. 27, 2025

(30) Foreign Application Priority Data

Aug. 24, 2023 (KR) ........................ 10-2023-0111401

(51) Int. Cl.
*B60W 40/06* (2012.01)
*B60W 10/18* (2012.01)
*B60W 30/18* (2012.01)
*B60W 60/00* (2020.01)

(52) U.S. Cl.
CPC .......... *B60W 60/001* (2020.02); *B60W 10/18* (2013.01); *B60W 30/18109* (2013.01); *B60W 2530/10* (2013.01); *B60W 2552/15* (2020.02)

(58) Field of Classification Search
CPC .............. B60W 60/001; B60W 10/18; B60W 30/18109; B60W 2530/10; B60W 2552/15; B60W 2720/106; B60W 40/076; B60W 40/10; B60W 2050/0022; B60W 2710/18; B60T 2210/20; B60T 8/171; B60T 8/172; B60T 2210/24; B60T 2250/02; B60Y 2300/18108
See application file for complete search history.

(56) References Cited

U.S. PATENT DOCUMENTS

| | | | | | |
|---|---|---|---|---|---|
| 6,249,735 B1 * | 6/2001 | Yamada | ................ | B60W 10/18 701/65 |
| 12,466,399 B2 * | 11/2025 | Kim | .................... | B60W 40/072 |
| 12,467,756 B2 * | 11/2025 | Lawrence | .............. | G01C 21/28 |
| 2008/0071453 A1 * | 3/2008 | Nakanishi | ............... | B60T 10/02 477/107 |

(Continued)

FOREIGN PATENT DOCUMENTS

KR 20220056933 A * 5/2022 .......... B60W 40/076

*Primary Examiner* — Masud Ahmed
(74) *Attorney, Agent, or Firm* — Lempia Summerfield Katz LLC

(57) ABSTRACT

Disclosed is a device for controlling a vehicle. The device includes a memory and a controller. For example, the device identifies at least one score in association with a travel state of a host vehicle, identifies a final score using the at least one score and at least one weight respectively corresponding to the at least one score, generates a braking control signal based on the final score, and performs braking control for the host vehicle based on the braking control signal.

20 Claims, 8 Drawing Sheets

VEHICLE CONTROL DEVICE 100

BRAKING DEVICE 110

MEMORY 120

CONTROLLER 130

(56) References Cited

U.S. PATENT DOCUMENTS

2008/0269013 A1 * 10/2008 Minaki ................. F16H 61/143
                                                        701/58
2022/0397402 A1 * 12/2022 Bolless .............. G01C 21/3841
2025/0236291 A1 *  7/2025 Heim ................. B60W 60/0011
2025/0285292 A1 *  9/2025 Byk ....................... G06V 10/25

* cited by examiner

VEHICLE CONTROL DEVICE 100

BRAKING DEVICE 110

MEMORY 120

CONTROLLER 130

FIG.1

INPUT REQUIRED DECELERATION S212

ESTIMATE ROAD SLOPE S214

ESTIMATE VEHICLE WEIGHT S216

PERFORM SCORING BASED ON TRAVEL STATE S220

PERFORM FINAL SCORING APPLYING WEIGHT S230

DETERMINE INITIAL SLEW AND SLEW TIME S242

DETERMINE CONTROLLER GAIN S244

OUTPUT BRAKING COMMAND S250

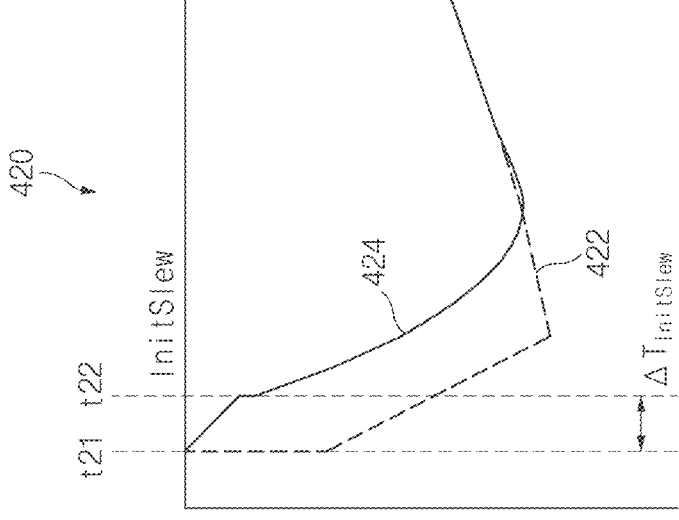
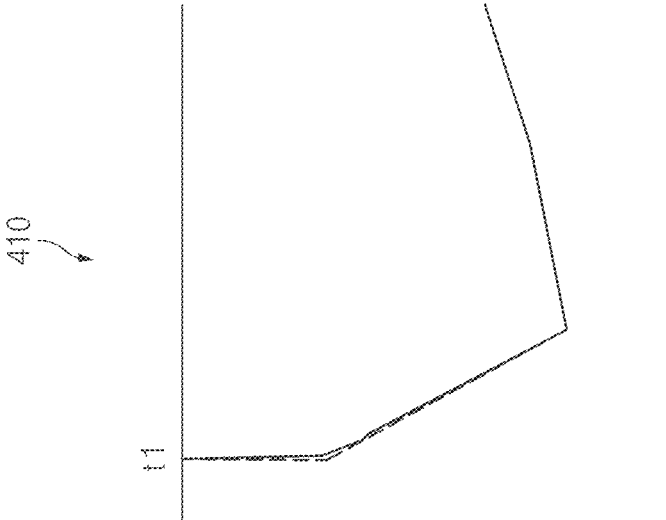
F I G . 4

START

IDENTIFY AT LEAST ONE SCORE IN ASSOCIATION
WITH TRAVEL STATE OF HOST VEHICLE          ~S610

IDENTIFY FINAL SCORE USING AT LEAST ONE SCORE
AND AT LEAST ONE WEIGHT RESPECTIVELY
CORRESPONDING TO AT LEAST ONE SCORE          ~S620

GENERATE BRAKING CONTROL SIGNAL
BASED ON FINAL SCORE          ~S630

PERFORM BRAKING CONTROL FOR HOST VEHICLE
BASED ON BRAKING CONTROL SIGNAL          ~S640

END

DEVICE AND METHOD FOR CONTROLLING A VEHICLE

CROSS-REFERENCE TO RELATED APPLICATION

This application claims the benefit of priority to Korean Patent Application No. 10-2023-0111401, filed in the Korean Intellectual Property Office on Aug. 24, 2023, the entire contents of which are incorporated herein by reference.

TECHNICAL FIELD

The present disclosure relates to a device and a method for controlling a vehicle, and more specifically, to a technology for adaptively generating a braking control signal for braking control based on a travel state of a host vehicle.

BACKGROUND

As vehicles that may travel based on autonomous driving or smart cruise control gradually spread, various technologies related to such driving types are being developed. For example, autonomous driving may be divided into partial automation, conditional automation, high automation, and/or full automation depending on a level of control thereof.

In one example, among vehicle control functions, various types of control algorithms (or functions) for braking control of a host vehicle are being developed.

For example, a vehicle control device may perform the braking control of the host vehicle using at least one braking control device (e.g., a primary braking device and/or an auxiliary braking device). The at least one braking control device may include, for example, an electromagnetic retarder.

For example, the vehicle control device may optimize an operating state of a battery and/or a coil included in the host vehicle by controlling the electromagnetic retarder included in the auxiliary braking device.

However, when the vehicle control device performs the braking control for the host vehicle, only durability during operation of a specific braking device is considered, and a riding comfort experienced by a user in the host vehicle is not considered.

In addition, when a situation requiring over-braking occurs when the vehicle control device performs the braking control, braking and operating are repeatedly performed to appropriately adjust a stopping distance, which causes a feeling of discomfort of the user in the host vehicle.

Furthermore, when various items are loaded on the host vehicle controlled by the vehicle control device, a weight of the host vehicle may increase, and there may be cases where the host vehicle travels on a road with a slope, such as an uphill or downhill road. In such situations, when performing the braking control, the riding comfort of the user may be relatively more deteriorated.

SUMMARY

The present disclosure has been made to solve the above-mentioned problems occurring in the prior art while advantages achieved by the prior art are maintained intact.

An aspect of the present disclosure provides a vehicle control device that first identifies information of a travel state of a host vehicle, generates a braking control signal based on at least one score respectively corresponding to the identified information, and provides a braking function based on the generated braking control signal.

Another aspect of the present disclosure provides a vehicle control device that generates a braking control signal using each of at least one score including at least one of a first score corresponding to a weight of a host vehicle, a second score corresponding to a slope of a road on which the host vehicle is driving, a third score corresponding to a required deceleration of the host vehicle, or any combination thereof.

Another aspect of the present disclosure provides a vehicle control device that identifies a final score using at least one weight respectively corresponding to at least one score, generates a braking control signal using at least one of an initial slew rate (slew rate), a slew time, a controller gain, or any combination thereof identified based on a magnitude of the final score.

Another aspect of the present disclosure provides a vehicle control device that identifies a value generated by subtracting a score identified in proportion to a slope from a specified value as a second score when a road on which a host vehicle is traveling is an uphill road.

Another aspect of the present disclosure provides a vehicle control device that performs braking control by generating a braking control signal to be generated to be similar to an existing braking control signal that has been generated in advance as a final score increases.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a device for controlling a vehicle includes a memory that stores one or more instructions, and a controller operatively connected to the memory. The instructions, when executed by the controller, cause the device to identify at least one score in association with a travel state of a host vehicle, identify a final score using the at least one score and at least one weight respectively corresponding to the at least one score, generate a braking control signal based on the final score, and perform braking control for the host vehicle based on the braking control signal.

In one implementation, the instructions, when executed by the controller, may cause the device to identify the travel state of the host vehicle, including at least one of a weight of the host vehicle, a slope of a road where the host vehicle is traveling, a required deceleration of the host vehicle, or any combination thereof, and identify the at least one score including a first score corresponding to the weight, a second score corresponding to the slope, and a third score corresponding to the required deceleration.

In one implementation, the instructions, when executed by the controller, may cause the device to identify the first score to be proportional to the weight.

In one implementation, the instructions, when executed by the controller, may cause the device to identify the second score to be proportional to the slope.

In one implementation, the instructions, when executed by the controller, may cause the device to identify a value obtained by subtracting a score identified in proportion to the slope from a specified value as the second score when the host vehicle is identified as traveling on an uphill road.

In one implementation, the instructions, when executed by the controller, may cause the device to identify the third score in proportion to an absolute value of the required deceleration.

In one implementation, a sum of the at least one weight may be set not to exceed a predefined value.

In one implementation, the instructions, when executed by the controller, may cause the device to identify braking parameters including at least one of an initial slew rate, a slew time, a controller gain, or any combination thereof for the braking control based on the final score, and generate the braking control signal based on at least some of the braking parameters.

In one implementation, the instructions, when executed by the controller, may cause the device to perform the braking control for the host vehicle by generating the braking control signal to be similar to an existing braking control signal as the final score increases.

In one implementation, the device may further include a braking device. For example, the instructions, when executed by the controller, may cause the device to transmit the braking control signal to the braking device, and perform the braking control for the host vehicle based on the braking control signal using the braking device.

According to another aspect of the present disclosure, a method for controlling a vehicle includes: identifying, by a controller, at least one score in association with a travel state of a host vehicle; identifying, by the controller, a final score using the at least one score and at least one weight respectively corresponding to the at least one score; generating, by the controller, a braking control signal based on the final score; and performing, by the controller, braking control for the host vehicle based on the braking control signal.

In one implementation, the identifying, by the controller, of the at least one score may include: identifying, by the controller, the travel state of the host vehicle, including at least one of a weight of the host vehicle, a slope of a road where the host vehicle is traveling, a required deceleration of the host vehicle, or any combination thereof; and identifying, by the controller, the at least one score including a first score corresponding to the weight, a second score corresponding to the slope, and a third score corresponding to the required deceleration.

In one implementation, the identifying, by the controller, of the at least one score may include identifying, by the controller, the first score to be proportional to the weight.

In one implementation, the identifying, by the controller, of the at least one score may include identifying, by the controller, the second score to be proportional to the slope.

In one implementation, the identifying, by the controller, of the at least one score may include identifying, by the controller, a value obtained by subtracting a score identified in proportion to the slope from a specified value as the second score when the host vehicle is identified as traveling on an uphill road.

In one implementation, the identifying, by the controller, of the at least one score may include identifying, by the controller, the third score in proportion to an absolute value of the required deceleration.

In one implementation, a sum of the at least one weight may be set not to exceed a predefined value.

In one implementation, the generating, by the controller, of the braking control signal based on the final score may include: identifying, by the controller, braking parameters including at least one of an initial slew rate, a slew time, a controller gain, or any combination thereof for the braking control based on the final score; and generating, by the controller, the braking control signal based on at least some of the braking parameters.

In one implementation, the method may further include performing, by the controller, the braking control for the host vehicle by generating the braking control signal to be similar to an existing braking control signal as the final score increases.

In one implementation, the method may further include transmitting, by the controller, the braking control signal to a braking device, and performing, by the controller, the braking control for the host vehicle based on the braking control signal using the braking device.

BRIEF DESCRIPTION OF THE DRAWINGS

The above and other objects, features and advantages of the present disclosure should be more apparent from the following detailed description taken in conjunction with the accompanying drawings:

FIG. 1 is a block diagram showing components of a vehicle control device according to an embodiment of the present disclosure;

FIG. 4 illustrates graphs comparing an existing braking control signal and a braking control signal generated by a vehicle control device according to an embodiment of the present disclosure;

In relation to the description of the drawings, the same or similar reference numerals may be used for the same or similar components.

DETAILED DESCRIPTION

Figure 2:
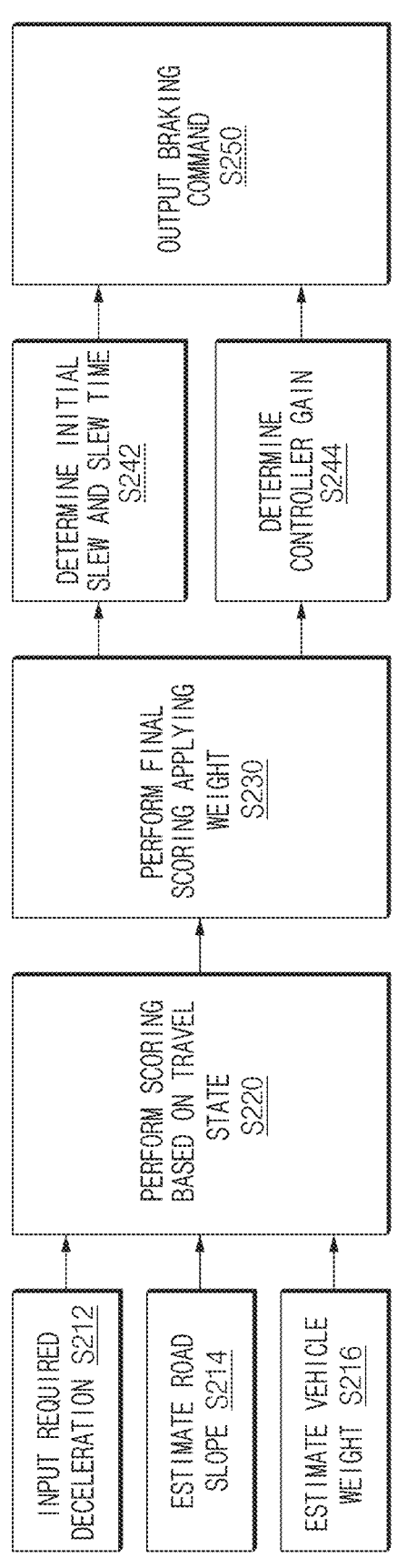
FIG. 2 is a flowchart of a vehicle control method according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function has been omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 1:
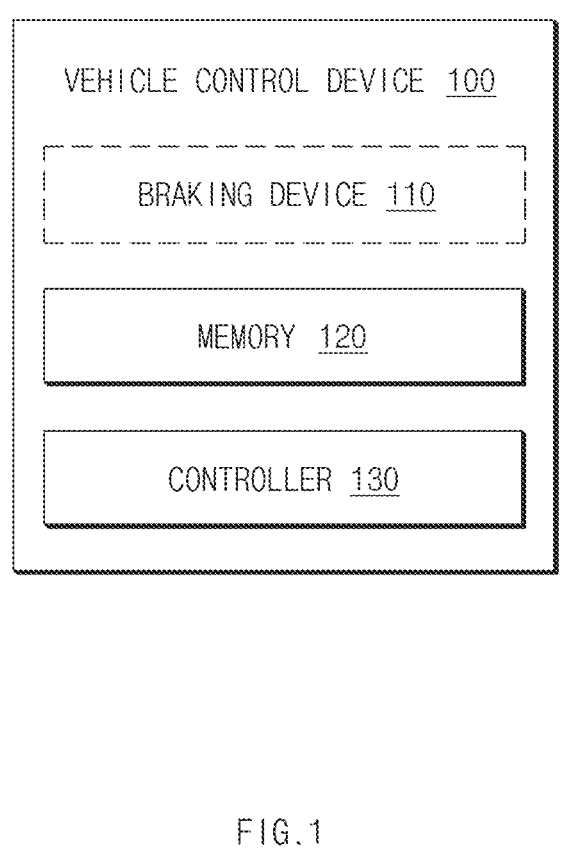

Hereinafter, embodiments of the present disclosure are described in detail with reference to FIGS. 1-7.

FIG. 1 is a block diagram showing components of a vehicle control device according to an embodiment of the present disclosure.

According to one embodiment, a vehicle control device 100 may include at least one of a braking device 110, a memory 120, a controller 130, or any combination thereof. The configuration of the vehicle control device 100 shown in FIG. 1 is illustrative, and embodiments of the present disclosure are not limited thereto. For example, the vehicle control device 100 may further include components not shown in FIG. 1 (e.g., at least one of an interface, a sensor, a communication device, a display, or any combination thereof).

According to one embodiment, the braking device 110 may include at least one braking device for braking control of a host vehicle.

For example, the braking device 110 may include a primary braking device and an auxiliary braking device.

As an example, the primary braking device may include a mechanical brake (e.g., an inertial braking brake and a cable parking brake) or a hydraulic brake (e.g., a disk brake and a drum brake). As an example, the auxiliary braking device may include an engine brake, an exhaust brake, an eddy current brake, a hydro-dynamic brake, an aerodynamic deceleration brake, a jake brake, and/or a retarder brake.

For example, the vehicle control device 100 may generally perform the braking control for the host vehicle using the primary braking device. The host vehicle may also perform the braking control for the host vehicle further using the auxiliary braking device in a specific situation (e.g., a situation of travelling on a road with a high slope or the like).

For example, the braking device 110 may operate based on a braking control signal transmitted from the controller 130.

According to one embodiment, the memory 120 may store instructions or data. For example, the memory 120 may store one or more instructions that, when executed by the controller 130, cause the vehicle control device 100 to perform various operations.

For example, the memory 120 may be implemented as one chipset with the controller 130. The controller 130 may include at least one of a communication processor and a modem.

For example, the memory 120 may store various information related to the vehicle control device 100. As an example, the memory 120 may store information on an operation history of the controller 130. As an example, the memory 120 may store information related to states and/or operation of components of the host vehicle (e.g., at least one of an engine control unit (ECU), the braking device 110, the controller 130, or any combination thereof).

For example, the memory 120 may store at least one mapping table. The memory 120 may store, for example, a mapping table regarding a final score, an initial slew rate, a slew time, and/or a controller gain. For example, the mapping table may contain at least one data stored such that the initial slew rate, the slew time, and the controller gain correspond in such a way that the greater the final score, the stronger the braking control of the host vehicle.

According to one embodiment, the controller 130 may be operatively connected to the braking device 110 and/or the memory 120. For example, the controller 130 may control operation of the braking device 110 and/or the memory 120.

For example, the controller 130 may identify at least one score related to a travel state of the host vehicle.

As an example, the controller 130 may identify the travel state of the host vehicle, including at least one of the weight of the host vehicle, a slope of a road on which the host vehicle is traveling, a required deceleration of the host vehicle, or any combination thereof.

As an example, the controller 130 may identify at least one score including a first score corresponding to the weight, a second score corresponding to the slope, and a third score corresponding to the required deceleration.

As an example, the controller 130 may identify the first score to be proportional to the weight. In other words, the controller 130 may identify the first score having a greater value as the weight increases.

As an example, the controller 130 may identify the second score to be proportional to the slope. In other words, the controller 130 may identify the second score with a greater value as the slope increases (or as an inclination increases).

As an example, when the host vehicle is identified as traveling on an uphill road, the controller 130 may identify a value obtained by subtracting a score identified in proportion to the slope from a specified value (e.g., 11) as the second score. For example, the controller 130 may first identify the score proportional to a magnitude of the identified slope, and then, when it is determined that the road on which the host vehicle is traveling corresponds to the uphill road, finally identify the value obtained by subtracting the identified score from the specified value as the second score. Accordingly, the controller 130 may generate the braking control signal that includes a smaller deceleration control amount in the uphill road compared to a downhill road.

As an example, the controller 130 may identify the third score in proportion to an absolute value of the required deceleration. In other words, the controller 130 may identify the third score having a greater value as the absolute value of the required deceleration increases (or as the host vehicle must be decelerated more strongly).

For example, the controller 130 may set a sum of at least one weight not to exceed a predefined value (e.g., 1) and apply each weight to each of the at least one score.

As an example, the at least one weight may be a setting value pre-stored by a user and/or a developer, and may be a setting value that may be changed depending on the travel state of the host vehicle. For example, the controller 130 may apply a relatively high weight to a score that has a greater impact on performing the braking control for the host vehicle, based on the travel state.

For example, the controller 130 may identify braking parameters including at least one of the initial slew rate, the slew time, the controller gain, or any combination thereof for the braking control, based on the final score.

For example, the controller 130 may generate the braking control signal based on at least some of the braking parameters.

For example, as the final score increases, the controller 130 may perform the braking control for the host vehicle by generating the braking control signal to be similar to an existing braking control signal.

As an example, as the final score increases, the controller 130 may generate the braking control signal to be closer to the existing braking control signal, and as the final score decreases, the controller 130 may generate the braking control signal to be differently from the existing braking control signal.

As an example, as the final score decreases, the controller 130 may generate the braking control signal to perform the braking control for the host vehicle in a relatively weak manner.

For example, the controller 130 may transmit the braking control signal to the braking device 110 (e.g., the primary braking device), and perform the braking control for the host vehicle based on the braking control signal using the braking device 110.

The components of the vehicle control device 100 shown in FIG. 1 are illustrative, and the embodiments of the present disclosure are not limited thereto. For example, the vehicle control device 100 may further include the sensor (not shown) and/or the communication device (not shown).

For example, the sensor may include at least one sensor including at least one of a camera, a radar, a LiDAR, or any combination thereof.

For example, the sensor may directly sense information on the road on which the host vehicle is traveling (e.g., the slope of the road, a type of road, a surface condition of the road, and a traffic volume of the road).

For example, the sensor may identify information on a travel situation of the host vehicle (e.g., at least one of a real-time travel speed, an acceleration, a travel direction, the weight of the vehicle, the required deceleration, or any combination thereof).

According to one embodiment, the communication device may obtain (or identify) various information used regarding the travel of the host vehicle.

According to one embodiment, the communication device may support establishment of a communication channel (e.g., a wireless communication channel) between the vehicle control device 100 and an external device and performance of communication via the established communication channel. For example, the communication device may include at least one communication processor that operates independently of the controller 130 (e.g., an application processor) and supports direct (e.g., wired) communication or wireless communication.

For example, the communication device may include a wireless communication module (e.g., a cellular communication module, a short-range wireless communication module, or a global navigation satellite system (GNSS) communication module) or a wired communication module (e.g., a local area network (LAN) communication module or a power line communication module). Among such communication modules, a corresponding communication module may be in communication with the external device via a first network (e.g., a short-range communication network such as Bluetooth, wireless fidelity (Wifi) direct, or infrared data association (IrDA)) or a second network (e.g., a telecommunication network such as a legacy cellular network, a 5G network, a next-generation communication network, the Internet, or a computer network (e.g., LAN or WAN)) included in a network. Such various types of communication modules may be integrated into one component (e.g., a single chip) or may be implemented as a plurality of separate components (e.g., multiple chips). Additionally, the communication device may be implemented as the single chip together with the controller 130.

The above-described operations of the sensor and the communication device may be performed under control of the controller 130.

FIG. 2 is a flowchart of a vehicle control method according to an embodiment of the present disclosure.

According to one embodiment, a vehicle control device (e.g., the vehicle control device 100 in FIG. 1) may perform operations disclosed in FIG. 2. For example, at least some of components included in the vehicle control device 100 (e.g., the braking device 110, the memory 120, and/or the controller 130 in FIG. 1) may be set to perform the operations in FIG. 2.

In a following embodiment, operations S212 to S250 may be performed sequentially, but may not be necessarily performed sequentially. For example, an order of each operation may be changed, and at least two operations may be performed in parallel with each other. Additionally, content with respect to FIG. 2 that corresponds to or is redundant with the content described above is briefly described or omitted.

According to one embodiment, the vehicle control device may input a required deceleration (S212).

For example, the vehicle control device may identify the required deceleration for the braking control of the host vehicle and input the required deceleration to a controller (e.g., the controller 130 in FIG. 1). The required deceleration may be, for example, one of braking parameters for generating an existing braking control signal.

According to one embodiment, the vehicle control device may estimate a road slope (S214).

For example, the vehicle control device may use a sensor to identify the slope of the road on which the host vehicle is traveling.

For example, the vehicle control device may further estimate (identify) not only the slope of the road, but also at least one of a type of road (e.g., the uphill road or the downhill road), a curvature of the road, a surface condition of the road, or any combination thereof.

According to one embodiment, the vehicle control device may estimate a vehicle weight (S216).

For example, the vehicle control device may use the sensor to identify a real-time total weight of the vehicle, including all loaded items.

According to one embodiment, the vehicle control device may perform a scoring operation based on a travel state (S220).

For example, the vehicle control device may identify at least one score corresponding to each of the travel states identified based on operations S212, S214, and S216.

For example, the vehicle control device may identify at least one score including a first score corresponding to the weight, a second score corresponding to the slope, and a third score corresponding to the required deceleration.

According to one embodiment, the vehicle control device may perform a final scoring operation applying weight (S230).

For example, the vehicle control device may identify a final score by multiplying the at least one score by at least one weight respectively corresponding to the at least one score and adding up all the multiplied results.

According to one embodiment, the vehicle control device may determine (or identify) an initial slew (or slew rate) and a slew time (S242).

For example, the vehicle control device may determine a slew rate (or a slew slope) for a specified time and a slew time in an initial stage after starting the braking control for the host vehicle.

According to one embodiment, the vehicle control device may determine (or identify) a controller gain (S244).

According to one embodiment, the vehicle control device may output a braking command (S250).

For example, the vehicle control device may operate a braking device (e.g., the braking device 110 in FIG. 1) using the braking command including a braking control signal.

For example, the vehicle control device may identify the braking control signal using at least some of the braking parameters (e.g., the initial slew rate, the slew time, and/or the controller gain) determined in operations S242 and S244, and output the braking command including the identified braking control signal to the braking device.

Figure 3A:
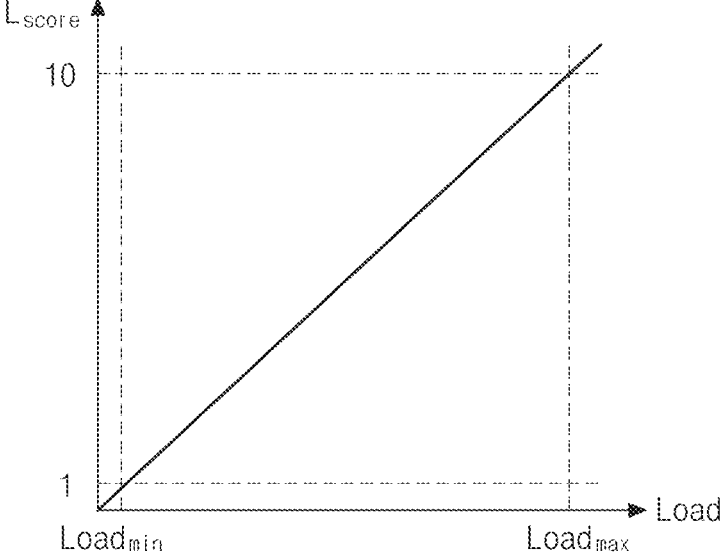
FIG. 3A illustrates graphs for score identification in a vehicle control device according to an embodiment of the present disclosure.
Figure 3A:
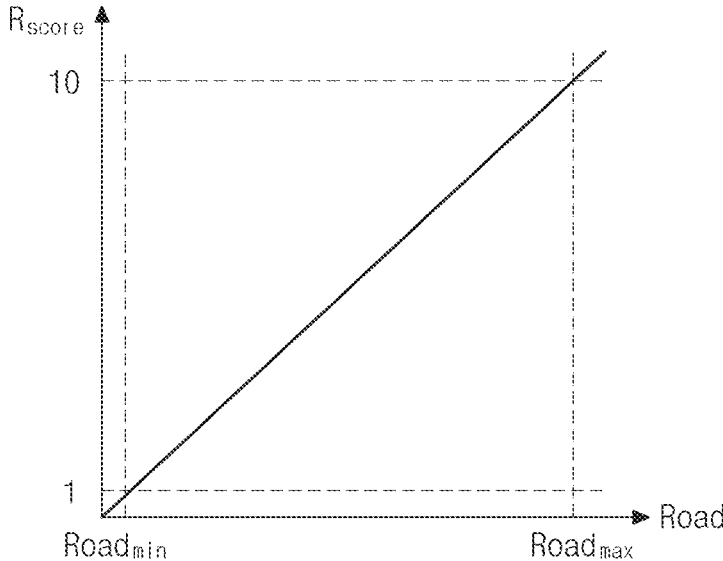

FIG. 3A illustrates graphs for score identification in a vehicle control device according to an embodiment of the present disclosure.

According to one embodiment, a vehicle control device (e.g., the vehicle control device 100 in FIG. 1) may identify a first score $L_{score}$ corresponding to a weight of a host vehicle and a second score $R_{score}$ corresponding to a slope of a road.

Referring to the graph at the top of FIG. 3A, the vehicle control device may identify the first score $L_{score}$ having a greater value as the weight of the host vehicle (e.g., a load on an x-axis) increases.

For example, the first score $L_{score}$ may have a value of one of real numbers from a minimum value (e.g., 0) to a maximum value (e.g., 10).

For example, the first score $L_{score}$ may be identified to have the maximum value when the host vehicle is loaded with (i.e., carrying) items with an amount corresponding to a maximum load capacity of the vehicle.

For example, the first score $L_{score}$ may be identified to have the minimum value when the weight of the host vehicle corresponds to an empty vehicle weight.

Referring to the graph at the bottom of FIG. 3A, the vehicle control device may identify the second score $R_{score}$ having a greater value as the slope of the road on which the host vehicle is traveling (e.g., a road on an x-axis) is greater.

For example, the second score $R_{score}$ may have a value of one of real numbers from a minimum value (e.g., 0) to a maximum value (e.g., 10).

For example, the second score $R_{score}$ may be identified to have the maximum value when the host vehicle is traveling on a road with a maximum travelable slope.

For example, the second score $R_{score}$ may be identified to have the minimum value when the host vehicle is traveling on level ground.

For example, the method for identifying the second score $R_{score}$ described above may be applied in a situation where the host vehicle is traveling on a downhill road or the level ground.

In one embodiment, when the host vehicle is traveling on an uphill road, the vehicle control device may identify a value obtained by subtracting the score identified by the method described above from a specified value (e.g., 11) as the second score $R_{score}$.

For example, in the situation where the host vehicle is traveling on the uphill road, when the host vehicle is traveling on the road with the maximum travelable slope (in other words, when the host vehicle is traveling on the uphill road with the maximum travelable slope), the second score $R_{score}$ may be identified to have the minimum value.

In FIG. 3A, the first score $L_{score}$ and the second score $R_{score}$ are shown to be proportional to the weight of the host vehicle and the slope of the road, respectively, based on a first-order linear function, but this is an example of a proportional relationship and the embodiments of the present disclosure are not limited thereto.

Figure 3B:
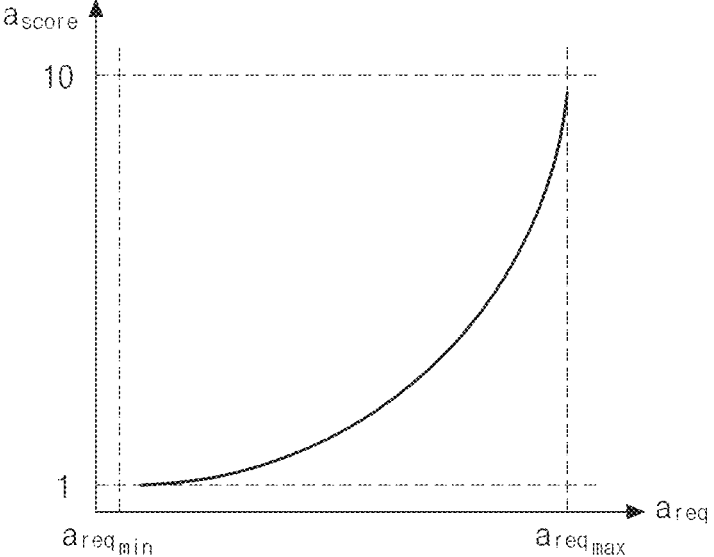
FIG. 3B illustrates a graph for score identification in a vehicle control device according to an embodiment of the present disclosure.

FIG. 3B illustrates a graph for score identification in a vehicle control device according to an embodiment of the present disclosure.

According to one embodiment, a vehicle control device (e.g., the vehicle control device 100 in FIG. 1) may identify a third score $A_{score}$ corresponding to a required deceleration of a host vehicle.

Referring to the graph in FIG. 3B, the vehicle control device may identify the third score $A_{score}$ having a greater value as an absolute value of the required deceleration of the host vehicle (e.g., $a_{req}$ on an x-axis) increases.

For example, the third score $A_{score}$ may have a value of one of real numbers from a minimum value (e.g., 0) to a maximum value (e.g., 10).

For example, the third score $A_{score}$ may be identified to have the maximum value when the required deceleration based on an existing braking control signal generated by the host vehicle is in a first range (e.g., $-2$ to $-3.5$ m²).

For example, the third score $A_{score}$ may be identified to have the minimum value or a first value greater than the minimum value when the required deceleration based on the existing braking control signal generated by the host vehicle is in a second range (e.g., $-1$ to $0$ m²).

For example, the third score $A_{score}$ may be identified to have a second value greater than the first value described above and smaller than the maximum value when the required deceleration based on the existing braking control signal generated by the host vehicle is in a third range (e.g., $-1$ to $0$ m²) that is smaller than the second range and greater than the first range.

In FIG. 3B, the third score $A_{score}$ is shown to be proportional to a magnitude of the absolute value of the required deceleration corresponding to a quadratic function (or an exponential function), but this is an example of a proportional relationship and the embodiments of the present disclosure are not limited thereto.

FIG. 4 illustrates graphs comparing an existing braking control signal and a braking control signal generated by a vehicle control device according to an embodiment of the present disclosure.

Referring to FIG. 4, according to one embodiment, a vehicle control device (e.g., the vehicle control device 100 in FIG. 1) may generate a braking control signal 424 that is substantially the same as or different from an existing braking control signal 422 to perform braking control for a host vehicle.

Referring to reference numeral 410, according to one embodiment, the vehicle control device may generate the braking control signal based on a final score using at least some of travel states of the host vehicle at a first time point t1 at which the braking control is required.

A braking control signal according to reference numeral 410 may be a control signal generated substantially the same as (or similar to) the existing braking control signal.

For example, when the final score is identified as being close to a maximum value (e.g., 10), the vehicle control device may generate the braking control signal to be relatively more similar to the existing braking control signal to perform the braking control for the host vehicle.

Referring to reference numeral 420, according to one embodiment, the vehicle control device may generate the braking control signal based on a final score using at least some of travel states of the host vehicle at a second time point t21 at which the braking control is required.

The braking control signal 424 according to reference numeral 420 may be a control signal generated differently from the existing braking control signal 422.

For example, as the final score decreases, the vehicle control device may generate the braking control signal 424 that causes the host vehicle to brake relatively weaker than the existing braking control signal 422 in an initial stage of the braking control to perform the braking control for the host vehicle.

For example, the vehicle control device may identify an initial slew rate IninSlew for the braking control based on the final score. For example, the vehicle control device may identify the initial slew rate IninSlew corresponding to the identified final score, using a mapping table in which the initial slew rate corresponding to a magnitude of the final score is stored. The initial slew rate IninSlew may be a slew slope from the second time point t21 to a third time point t22, which is a time point after a specified time has elapsed. The vehicle control device may identify the braking control signal 424 using the identified initial slew rate IninSlew.

For example, the vehicle control device may identify a slew time $\Delta T_{InitSlew}$ for the braking control based on the final score. For example, the vehicle control device may identify the slew time $\Delta T_{InitSlew}$ corresponding to the identified final score, using a mapping table in which a slew time corresponding to the magnitude of the final score is stored. The slew time $\Delta T_{InitSlew}$ may be the time from the second time point t21 to the third time point t22, which is the time point after the specified time has elapsed. The vehicle control device may identify the braking control signal 424 using the identified slew time $\Delta T_{InitSlew}$.

Figure 5:
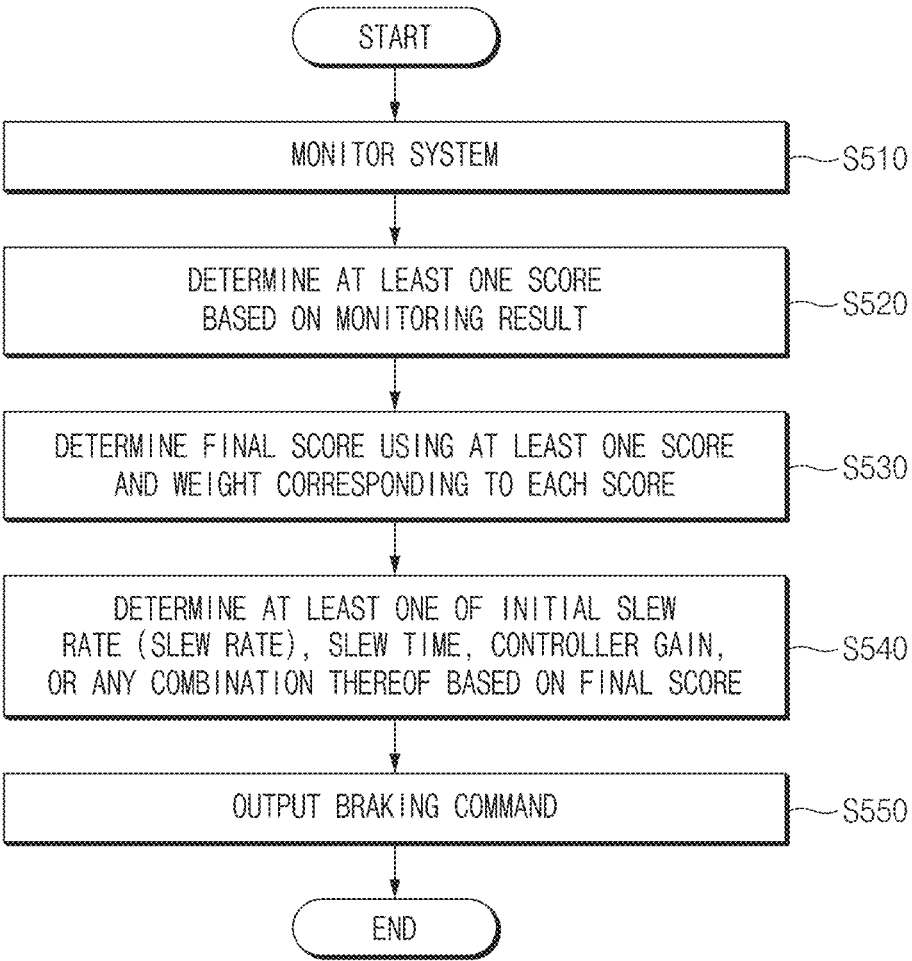
FIG. 5 is a flowchart of a vehicle control method according to an embodiment of the present disclosure.

FIG. 5 is a flowchart of a vehicle control method according to an embodiment of the present disclosure.

According to one embodiment, a vehicle control device (e.g., the vehicle control device in FIG. 1) may perform operations disclosed in FIG. 5. For example, at least some of components included in the vehicle control device (e.g., the braking device 110, the memory 120, and/or the controller 130 in FIG. 1) may be set to perform the operations in FIG. 5.

In a following embodiment, operations S510 to S550 may be performed sequentially, but may not be necessarily performed sequentially. For example, an order of each operation may be changed, and at least two operations may be performed in parallel with each other. Additionally, content with respect to FIG. 5 that corresponds to or is redundant with the content described above is briefly described or omitted.

According to one embodiment, the vehicle control device may monitor a system related to travel of a host vehicle (S510).

For example, the vehicle control device may monitor a travel state of the host vehicle.

For example, the vehicle control device may monitor information on a travel environment of the host vehicle.

As an example, the vehicle control device may monitor at least one of a vehicle weight of the host vehicle, a slope of a road on which the host vehicle is traveling, a required deceleration of the host vehicle based on an existing braking control signal that has been identified in advance, or any combination thereof.

According to one embodiment, the vehicle control device may determine at least one score based on the monitoring result (S520).

For example, the vehicle control device may identify at least one score respectively corresponding to the identified travel states.

For example, the vehicle control device may identify the at least one score including a first score corresponding to the weight, a second score corresponding to the slope, and a third score corresponding to the required deceleration.

For example, the vehicle control device may identify the first score, the second score, and the third score to be proportional to the weight, the slope, and a magnitude of an absolute value of the required deceleration, respectively.

According to one embodiment, the vehicle control device may determine a final score using the at least one score and at least one weight respectively corresponding to the scores (S530).

For example, the vehicle control device may identify a sum of results of respectively multiplying the at least one score by the at least one weight as the final score.

According to one embodiment, the vehicle control device may determine at least one of an initial slew rate (slew rate), a slew time, a controller gain, or any combination thereof based on the final score (S540).

For example, the vehicle control device may identify at least one of the initial slew rate, the slew time, the controller gain, or any combination thereof based on a magnitude of the final score using a mapping table that has been stored in advance in a memory (e.g., the memory 120 in FIG. 1).

According to one embodiment, the vehicle control device may output a braking command (S550).

For example, the vehicle control device may identify a braking control signal using at least some of the braking parameters identified in operation S540, and output the braking command including the identified braking control signal to at least one component (e.g., a primary braking device) of a braking device (e.g., the braking device 110 in FIG. 1).

Figure 6:
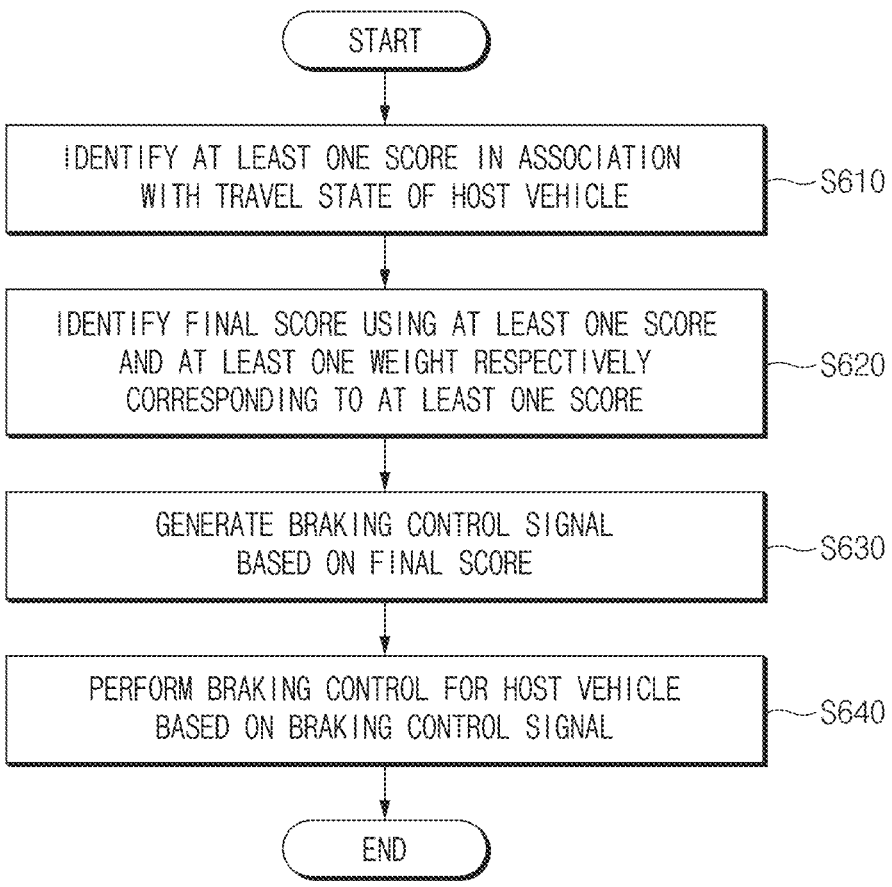
FIG. 6 is a flowchart of a vehicle control method according to an embodiment of the present disclosure.

FIG. 6 is a flowchart of a vehicle control method according to an embodiment of the present disclosure.

According to one embodiment, a vehicle control device (e.g., the vehicle control device in FIG. 1) may perform operations disclosed in FIG. 6. For example, at least some of components included in the vehicle control device (e.g., the braking device 110, the memory 120, and/or the controller 130 in FIG. 1) may be set to perform the operations in FIG. 6.

In a following embodiment, operations S610 to S640 may be performed sequentially, but may not be necessarily performed sequentially. For example, an order of each operation may be changed, and at least two operations may be performed in parallel with each other. Additionally, content with respect to FIG. 6 that corresponds to or is redundant with the content described above is briefly described or omitted.

According to one embodiment, the vehicle control device may identify at least one score in association with a travel state of a host vehicle (S610).

For example, the vehicle control device may identify the at least one score including a first score corresponding to weight, a second score corresponding to a slope, and a third score corresponding to a required deceleration.

According to one embodiment, the vehicle control device may identify a final score using the at least one score and at least one weight respectively corresponding to the at least one score (S620).

For example, the vehicle control device may identify a sum of results of respectively multiplying the at least one score by the at least one weight as the final score.

According to one embodiment, the vehicle control device may generate a braking control signal based on the final score (S630).

For example, the vehicle control device may identify braking parameters including at least one of an initial slew rate, a slew time, a controller gain, or any combination thereof based on a magnitude of the final score using a mapping table that has been stored in advance in a memory (e.g., the memory 120 in FIG. 1), and generate (or identify) the braking control signal using at least some of the braking parameters.

According to one embodiment, the vehicle control device may perform braking control for the host vehicle based on the braking control signal (S640).

For example, the vehicle control device may perform the braking control for the host vehicle by operating one component of the braking device (e.g., a primary braking device) based on the braking control signal.

Figure 7:
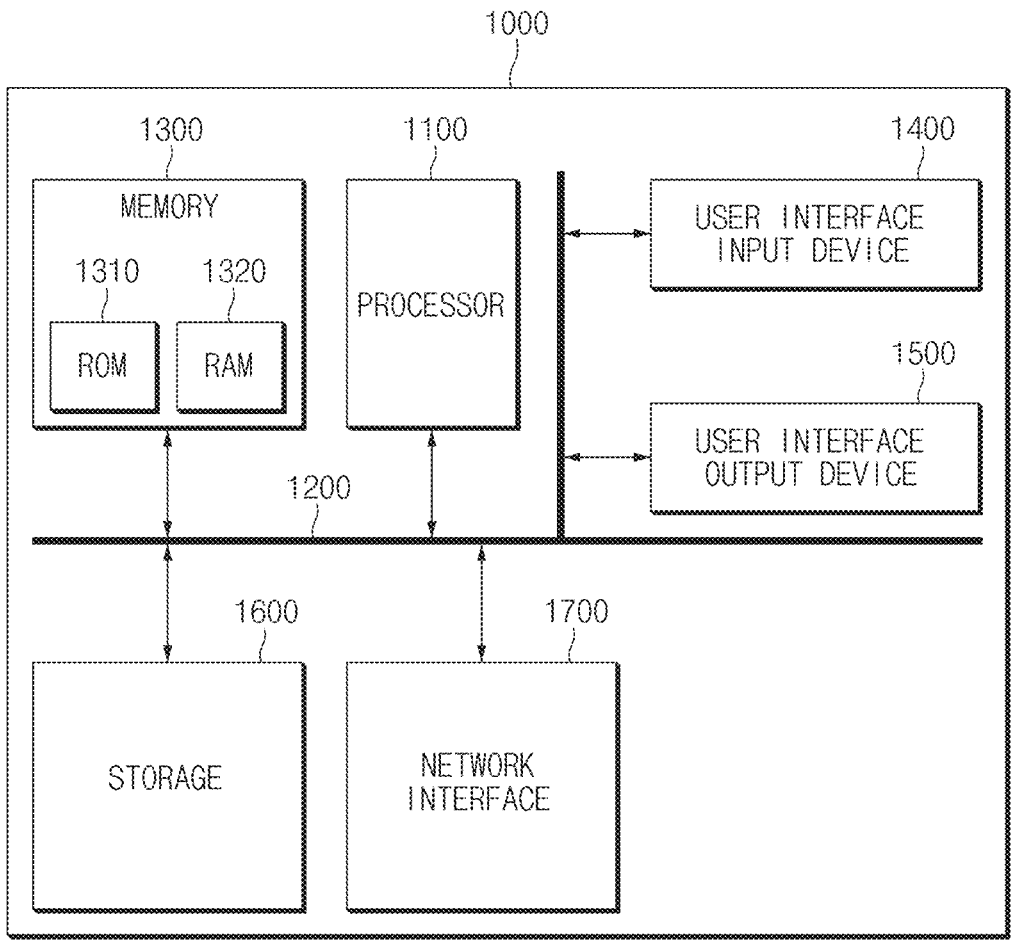
FIG. 7 shows a computing system related to a vehicle control method according to an embodiment of the present disclosure.

FIG. 7 shows a computing system related to a vehicle control method according embodiment of the present disclosure.

Referring to FIG. 7, a computing system 1000 related to the method for controlling the vehicle may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM.

The storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those having ordinary skill in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effect of the device and the method for controlling the vehicle according to the present disclosure are as follows.

According to at least one of the embodiments of the present disclosure, the vehicle control device may provide not only the durability of the braking device, but also better riding comfort to the user by generating the braking control signal based on the at least one parameter based on the travel state of the host vehicle when a braking situation occurs.

Additionally, according to at least one of the embodiments of the present disclosure, the vehicle control device may perform the braking control adaptively and stably even under various travel environments by sufficiently considering the various driving environments of the host vehicle when generating the braking control signal for the operation of the braking device (e.g., the primary braking device).

Additionally, according to at least one of the embodiments of the present disclosure, the vehicle control device may identify the score based on at least one of the slope of the road on which the host vehicle is traveling, the weight of the host vehicle, the real-time required deceleration of the host vehicle, or any combination thereof, and apply the greater weight to the score that has the significant impact on the travel of the host vehicle to generate the braking control signal appropriate for a situation.

In addition, various effects that are directly or indirectly identified through the present document may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A device for controlling a vehicle, the device comprising:
  a memory configured to store one or more instructions; and
  a controller operatively connected to the memory,
  wherein the instructions, when executed by the controller, cause the device to:
    identify at least one score in association with a travel state of a host vehicle;
    identify a final score using the at least one score and at least one weight respectively corresponding to the at least one score;
    generate a braking control signal based on the final score by modifying an existing braking control signal; and
    perform braking control for the host vehicle based on the braking control signal.

2. The device of claim 1, wherein the instructions, when executed by the controller, cause the device to:
  identify the travel state of the host vehicle, including at least one of a weight of the host vehicle, a slope of a road where the host vehicle is traveling, a required deceleration of the host vehicle, or any combination thereof; and
  identify the at least one score including a first score corresponding to the weight, a second score corresponding to the slope, and a third score corresponding to the required deceleration.

3. The device of claim 2, wherein the instructions, when executed by the controller, cause the device to identify the first score to be proportional to the weight.

4. The device of claim 2, wherein the instructions, when executed by the controller, cause the device to identify the second score to be proportional to the slope.

5. The device of claim 4, wherein the instructions, when executed by the controller, cause the device to identify a value obtained by subtracting a score identified in proportion to the slope from a specified value as the second score when the host vehicle is identified as traveling on an uphill road.

6. The device of claim 2, wherein the instructions, when executed by the controller, cause the device to identify the third score in proportion to an absolute value of the required deceleration.

7. The device of claim 1, wherein a sum of the at least one weight is set not to exceed a predefined value.

8. The device of claim 1, wherein the instructions, when executed by the controller, cause the device to:

identify braking parameters including at least one of an initial slew rate, a slew time, a controller gain, or any combination thereof for the braking control based on the final score; and generate the braking control signal based on at least some of the braking parameters.

9. The device of claim 1, wherein the instructions, when executed by the controller, cause the device to perform the braking control for the host vehicle by generating the braking control signal to be similar to an existing braking control signal as the final score increases.

10. The device of claim 1, further comprising:

a braking device, wherein the instructions, when executed by the controller, cause the device to:

transmit the braking control signal to the braking device; and perform the braking control for the host vehicle based on the braking control signal using the braking device.

11. A method for controlling a vehicle, the method comprising:

identifying, by a controller, at least one score in association with a travel state of a host vehicle;

identifying, by the controller, a final score using the at least one score and at least one weight respectively corresponding to the at least one score;

generating, by the controller, a braking control signal based on the final score by modifying an existing braking control signal; and performing, by the controller, braking control for the host vehicle based on the braking control signal.

12. The method of claim 11, wherein the identifying, by the controller, of the at least one score includes:

identifying, by the controller, the travel state of the host vehicle, including at least one of a weight of the host vehicle, a slope of a road where the host vehicle is traveling, a required deceleration of the host vehicle, or any combination thereof; and identifying, by the controller, the at least one score including a first score corresponding to the weight, a second score corresponding to the slope, and a third score corresponding to the required deceleration.

13. The method of claim 12, wherein the identifying, by the controller, of the at least one score includes:

identifying, by the controller, the first score to be proportional to the weight.

14. The method of claim 12, wherein the identifying, by the controller, of the at least one score includes:

identifying, by the controller, the second score to be proportional to the slope.

15. The method of claim 14, wherein the identifying, by the controller, of the at least one score includes:

identifying, by the controller, a value obtained by subtracting a score identified in proportion to the slope from a specified value as the second score when the host vehicle is identified as traveling on an uphill road.

16. The method of claim 12, wherein the identifying, by the controller, of the at least one score includes:

identifying, by the controller, the third score in proportion to an absolute value of the required deceleration.

17. The method of claim 11, wherein a sum of the at least one weight is set not to exceed a predefined value.

18. The method of claim 11, wherein the generating, by the controller, of the braking control signal based on the final score includes:

identifying, by the controller, braking parameters including at least one of an initial slew rate, a slew time, a controller gain, or any combination thereof for the braking control based on the final score; and generating, by the controller, the braking control signal based on at least some of the braking parameters.

19. The method of claim 11, further comprising:

performing, by the controller, the braking control for the host vehicle by generating the braking control signal to be similar to an existing braking control signal as the final score increases.

20. The method of claim 19, further comprising:

transmitting, by the controller, the braking control signal to a braking device; and performing, by the controller, the braking control for the host vehicle based on the braking control signal using the braking device.

* * * * *